(12) United States Patent
Grubic et al.

(10) Patent No.: US 9,919,615 B2
(45) Date of Patent: Mar. 20, 2018

(54) VOLTAGE GENERATION WITH HIGH MODULATION INDICES IN INVERTER DRIVES

(71) Applicant: Faraday&Future Inc., Gardena, CA (US)

(72) Inventors: Stefan Grubic, Hermosa Beach, CA (US); Mengwei Campbell, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/187,380

(22) Filed: Jun. 20, 2016

(65) Prior Publication Data

US 2017/0361732 A1 Dec. 21, 2017

(51) Int. Cl.
H02P 27/08 (2006.01)
B60L 15/02 (2006.01)
H02P 21/22 (2016.01)

(52) U.S. Cl.
CPC .............. *B60L 15/02* (2013.01); *H02P 21/22* (2016.02); *H02P 27/08* (2013.01); *B60L 2210/42* (2013.01); *B60L 2240/423* (2013.01)

(58) Field of Classification Search
CPC ........... B60L 15/02; H02P 21/22; H02P 27/08
USPC ......................................................... 318/139
See application file for complete search history.

(56) References Cited

U.S. PATENT DOCUMENTS

| 6,653,812 | B1* | 11/2003 | Huo | .................. | H02M 7/53875 |
| | | | | | 318/801 |
| 2011/0221367 | A1* | 9/2011 | Perisic | .............. | H02M 7/53871 |
| | | | | | 318/400.02 |
| 2012/0169263 | A1* | 7/2012 | Gallegos-Lopez | ..... | H02P 25/22 |
| | | | | | 318/400.29 |

OTHER PUBLICATIONS

A Novel Overmodulation Technique for Space-Vector PWM Inverters; by Dong-Choon Lee, Member, IEEE, and G-Myoung Lee; IEEE Transactions on Power Electronics, vol. 13, No. 6, November 1998 (pp. 1144-1151).*

* cited by examiner

*Primary Examiner* — Shawki A Ismail
*Assistant Examiner* — Muhammad S Islam
(74) *Attorney, Agent, or Firm* — Finnegan, Henderson Farabow, Garrett & Dunner, LLP

(57) ABSTRACT

Circuits, methods, and systems for driving a load are described. An exemplary driving circuit may include a plurality of switching devices and a controller electrically connected to the switching devices. The controller may be configured to receive a reference voltage signal indicating a target voltage for the driving circuit to generate to drive the load. The reference voltage signal may correspond to a reference space vector in a reference frame. The controller may also be configured to determine that the reference space vector falls within a holding region in which the reference voltage signal is subject to over-modulation. The controller may then generate an adjusted reference voltage signal by adjusting the reference space vector to match a predetermined space vector associated with the holding region. In addition, the controller may be configured to provide the adjusted reference voltage signal to the plurality of switching devices to drive the load.

17 Claims, 13 Drawing Sheets

VOLTAGE GENERATION WITH HIGH MODULATION INDICES IN INVERTER DRIVES

TECHNICAL FIELD

The present disclosure relates generally to driving circuit control and, more specifically, to space vector pulse width modulation (SVPWM)-based driving circuit control for generating driving voltages having high modulation indices.

BACKGROUND

Electric and hybrid vehicle propulsion systems typically employ an alternating current (AC) driving circuit, such as an inverter, to convert direct current (DC) voltage of an energy storage device to variable speed AC waveforms to drive an electric motor. The driving circuit usually includes power electronic devices such as insulated gate bipolar transistors (IGBTs) or metal-oxide-semiconductor field-effect transistors (MOSFETs) as switches to construct AC voltages for driving the electric motor by chopping the DC voltage according to a pulse width modulation (PWM) scheme. The constructed AC voltages normally contain a fundamental wave component (e.g., wave component having a fundamental frequency, usually the lowest frequency, that also corresponds to the desired AC voltage for driving the electric motor) and switching harmonics (e.g., wave components having much higher frequencies than the fundamental frequency) due to the PWM.

Because the AC voltages generated by the driving circuit are constructed from a DC voltage, the amplitude of the fundamental voltage is limited by the DC voltage. When the desired amplitude of the fundamental voltage is not very high, linear modulation may be used, in which the amplitude requirement can be met without introducing additional harmonics. When the desired amplitude of the fundamental voltage is high, however, additional harmonics have to be introduced. Existing methods of introducing harmonics to generate high-amplitude fundamental voltages are not optimized with respect to the number of switching operations, causing larger than necessary energy loss associated with the switching operations. Therefore, it is beneficial to reduce the number of switching instances while achieving the same high-amplitude fundamental voltage output.

SUMMARY

In one aspect, the present disclosure is directed to a driving circuit for driving a load. The driving circuit may include a plurality of switching devices electrically connected to the load. The driving circuit may also include a controller electrically connected to the plurality of switching devices. The controller may be configured to receive a reference voltage signal indicating a target voltage for the driving circuit to generate to drive the load. The reference voltage signal may correspond to a reference space vector in a reference frame. In the reference frame, a field flux linkage component and a torque component of the reference voltage signal are decoupled to orthogonal directions. The reference space vector may represent a combination of the decoupled field flux linkage component and the torque component of the reference voltage signal. The controller may also be configured to determine that the reference space vector falls within a holding region in which the reference voltage signal is subject to over-modulation. The controller may then generate an adjusted reference voltage signal by adjusting the reference space vector to match a predetermined space vector associated with the holding region. In addition, the controller may be configured to provide the adjusted reference voltage signal to the plurality of switching devices to drive the load.

In another aspect, the present disclosure is directed to a method for driving a load through a driving circuit including a plurality of switching devices. The method may include receiving a reference voltage signal indicating a target voltage to be generated by the driving circuit to drive the load. The reference voltage signal may correspond to a reference space vector in a reference frame. In the reference frame, a field flux linkage component and a torque component of the reference voltage signal are decoupled to orthogonal directions. The reference space vector may represent a combination of the decoupled field flux linkage component and the torque component of the reference voltage signal. The method may also include determining that the reference space vector falls within a holding region in which the reference voltage signal is subject to over-modulation. The method may further include generating an adjusted reference voltage signal by adjusting the reference space vector to match a predetermined space vector associated with the holding region. In addition, the method may include providing the adjusted reference voltage signal to the plurality of switching devices to drive the load.

In a further aspect, the present disclosure is directed to an electric motor propulsion system of an electric vehicle. The electric motor propulsion system may include an electric motor configured to output torque for propelling the electric vehicle. The electric motor propulsion system may also include a motor control system configured to control operations of the electric motor. The motor control system may include a driving circuit. The driving circuit may include a plurality of switching devices electrically connected to the electric motor. The driving circuit may also include a controller electrically connected to the plurality of switching devices. The controller may be configured to receive a reference voltage signal indicating a target voltage for the driving circuit to generate to drive the electric motor. The reference voltage signal may correspond to a reference space vector in a reference frame. In the reference frame, a field flux linkage component and a torque component of the reference voltage signal are decoupled to orthogonal directions. The reference space vector may represent a combination of the decoupled field flux linkage component and the torque component of the reference voltage signal. The controller may also be configured to determine that the reference space vector falls within a holding region in which the reference voltage signal is subject to over-modulation. The controller may then generate an adjusted reference voltage signal by adjusting the reference space vector to match a predetermined space vector associated with the holding region. In addition, the controller may be configured to provide the adjusted reference voltage signal to the plurality of switching devices to drive the electric motor.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

The foregoing general description and the following detailed description are exemplary and are not restrictive to the claims.

BRIEF DESCRIPTION OF THE DRAWINGS

Certain embodiments of the present disclosure are illustrated by the accompanying figures. These figures are not necessarily to scale. Details not necessary for understanding the technology or rendering other details difficult to perceive may be omitted. The technology is not necessarily limited to the particular embodiments illustrated herein.

DETAILED DESCRIPTION

Figure 1:
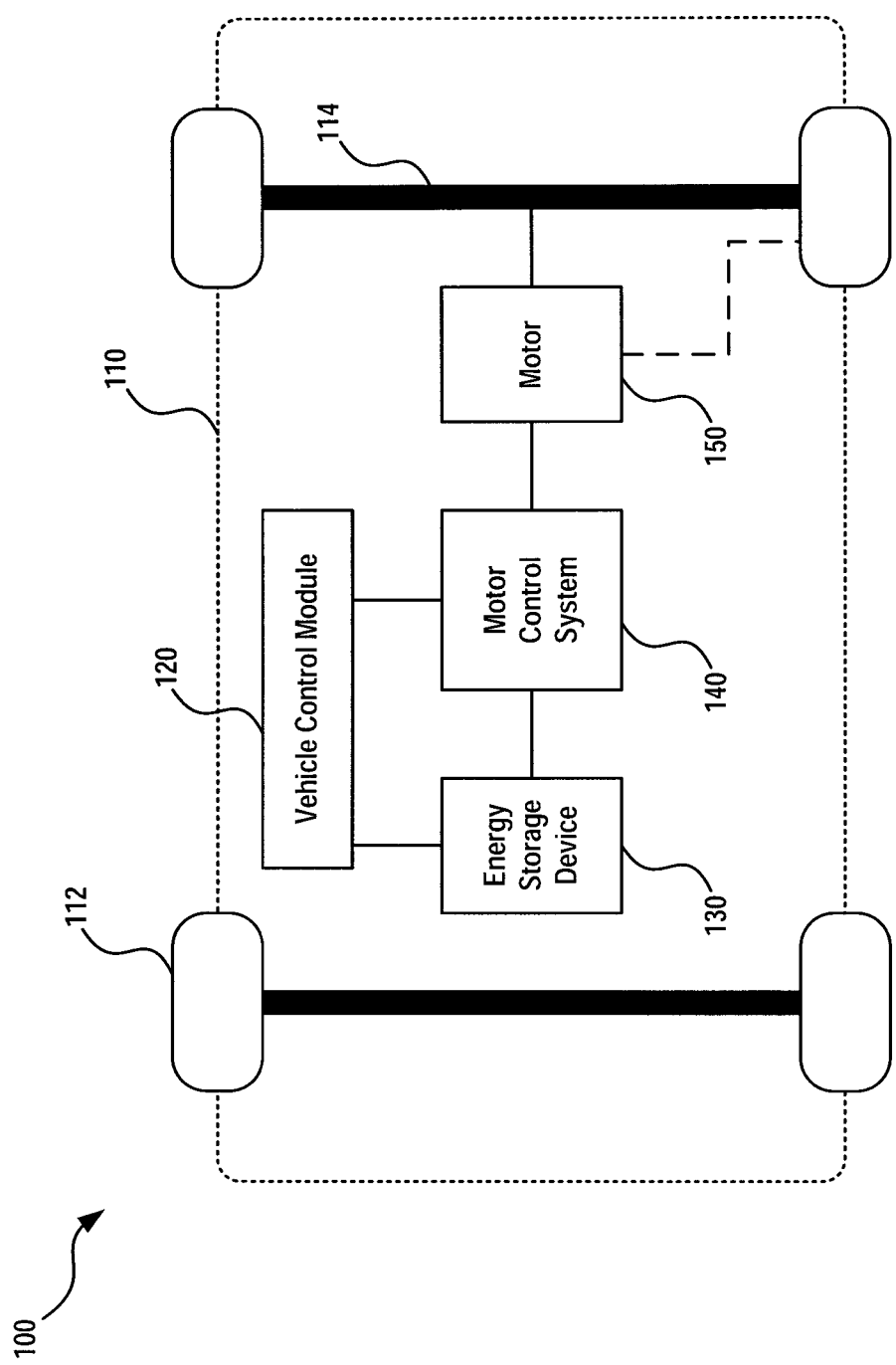
FIG. 1 is a block diagram of an exemplary embodiment of a vehicle equipped with an electric motor propulsion system, according to some disclosed embodiments.

Embodiments disclosed in the present application can be in many different forms. Specific embodiments and drawings described herein in detail are exemplary and are not limiting.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. Terms such as "comprises" and "comprising," when used in this specification, specify the presence of stated features, integers, steps, operations, elements, and/or components, but do not preclude the presence or addition of one or more other features, integers, steps, operations, elements, components, and/or groups thereof.

Like or analogous elements and/or components, referred to herein, may be identified throughout the drawings with like reference characters. Figures are merely schematic representations of the present disclosure. As such, some of the components may have been distorted from their actual scale for pictorial clarity.

Embodiments disclosed in the present application involve techniques for driving a load, such as an electric motor, using space vector pulse width modulation (SVPWM). In traction applications such as propelling an electric vehicle, an AC motor is usually used for providing the driving torque due to its high performance. The AC motor may be an induction motor machine, a permanent magnet motor machine, a synchronous motor machine, or any other suitable type of motor machine. In general, the AC motor is powered by a battery system that provides a DC voltage. The DC voltage needs to be converted into an AC voltage for driving the AC motor. The DC-AC conversion is usually conducted by an inverter, which can generate the AC voltage having desired frequency and amplitude by chopping the DC voltage using switching devices. In a typical two-level, six-pulse inverter, six power electronics devices, such as IGBTs or MOSFETs, are used as switching devices to form a three-phase switching network to convert the DC voltage into the desired AC voltage for driving the AC motor.

Switching operations of the switching network are normally controlled according to a PWM scheme, in which one or more of the switching devices are turned on for certain time durations (e.g., to allow electric current to flow through the turned-on device(s)) and/or turned off for certain time durations (e.g., to block electric current from flowing through the turned-off device(s)). The resulting AC wave thus includes a plurality of pulses having various widths and/or different polarities. This AC wave contains a fundamental wave component (e.g., according to Fourier decomposition), which is a sinusoidal wave having the fundamental frequency among all the wave components that compose the AC wave. In some cases, the fundamental frequency may also be referred to as the first-order or first harmonic. As used herein, however, harmonics refer to those wave components having frequencies higher than the fundamental frequency. Among the harmonics, those having frequencies up to several times of the fundamental frequency may also be referred to as low order harmonics, while those having frequencies more than 8, 10, or 12 times of the fundamental frequency may also be referred to as high order harmonics. Usually, the fundamental wave is considered the desired AC voltage used to drive the AC motor.

Because PWM technique utilizes short-pulsed DC voltages as building blocks to form an AC wave, the amplitude of the fundamental wave is limited by the DC voltage. For example, the maximum fundamental voltage that can be generated by a three-phase inverter is fixed for a given DC voltage ($V_{DC}$) and is reached when the inverter operates in a six-step mode. This maximum fundamental voltage has a magnitude of $$\frac{2}{\pi} V_{DC}.$$

With this maximum voltage, the voltage output of an inverter can be quantified relative to the maximum value using a term called modulation index. The modulation index is a ratio between a magnitude/amplitude of a fundamental wave of an output voltage and the magnitude/amplitude of the fundamental wave of the maximum fundamental output voltage. In other words, the modulation index is a scaled version of the output voltage with respect to the maximum fundamental output voltage (e.g., both measured in fundamental waves).

Different PWM schemes may reach different maximum modulation indices. For example, sinusoidal PWM (SPWM) can generate a maximum output voltage of $$\frac{1}{2} V_{DC},$$

corresponding to a maximum modulation index of $$\frac{\pi}{4} \approx 0.785.$$

Space vector PWM (SVPWM), if operating in a linear modulation range, can generate a maximum output voltage of $$\frac{1}{\sqrt{3}} V_{DC},$$

corresponding to a maximum modulation index of $$\frac{\pi}{2\sqrt{3}} \approx 0.907.$$

The linear modulation range means that the inverter can generate output voltages, up to the modulation index of about 0.907, without introducing additional harmonics. If higher output voltages are required, for example, with modulation index higher than 0.907, additional harmonics have to be introduced to reproduce the desired fundamental voltage. The corresponding operation range is often referred to as an over-modulation range or non-linear operating range. The over-modulation range also includes two modes. In mode I, the angle of the desired fundamental voltage is preserved and zero voltage vectors may still be used for some phase angles. The maximum modulation index can be reached in mode I is about 0.952. In mode II, zero voltage vectors are no longer used. The maximum modulation index can be reached in mode II is 1, when the mode II PWM operation reduces to the six-step mode and the corresponding fundamental voltage magnitude is $$\frac{2}{\pi} V_{dc}.$$

The technical solution disclosed in the present application is suitable in the over-modulation range and particularly in mode II operations where high amplitude voltage output is required. The embodiments described in this application can reduce the number of switching instances compared to some existing methods, thereby reducing the energy loss associated with the switching instances.

While the technical solution disclosed herein can be used in a variety of applications, traction applications such as propelling a vehicle can particularly benefit from the energy saving aspect provided by the disclosed solution. The following passages will describe embodiments in connection with a vehicle and its propulsion system. The technical aspects can be used in other applications as well.

FIG. 1 is a block diagram of an exemplary embodiment of a vehicle 100, according to one aspect of the disclosure. Vehicle 100 may have any body style, such as a sports car, a coupe, a sedan, a pick-up truck, a station wagon, a sports utility vehicle (SUV), a minivan, or a conversion van. Vehicle 100 may be an electric vehicle, a hybrid vehicle, or any other vehicle that is entirely or partially powered by electricity.

As shown in FIG. 1, vehicle 100 may include a chassis 110 and a plurality of wheels 112. Chassis 110 may be mechanically coupled to wheels 112 by, for example, a suspension system. Vehicle 100 may also include an electric or electrical motor propulsion system. For example, vehicle 100 may include one or more electric motors, such as motor 150, to supply motive torque. Wheels 112 may be coupled to motor 150 in various ways. In one embodiment, as illustrated in FIG. 1, opposite wheels may be connected through a shaft 114, which may be mechanically coupled to motor 150 to transmit torque and rotation from motor 150 to the connecting wheels. In another embodiment, motor 150 may drive individual wheels directly, as illustrated, in a simplified manner, by a dashed line from motor 150 to the lower right wheel. For example, motor 150 may be located close to a wheel to provide driving power directly to the wheel. In this case, multiple motors may be used and each wheel may be driven by a separate motor or a group of motors. In another example, motor 150 may be built into a wheel such that the wheel may rotate co-axially with a rotor of the motor.

Motor 150 may be an AC synchronous electric motor including a rotor and a stator (not shown). The stator may include a plurality of poles, with each pole including windings connected to an AC power source, such as a three-phase AC power source. During operation, the AC powered stator may generate a rotating magnetic field to drive the rotor to rotate. The rotor may include windings and/or permanent magnet(s) to form a magnet such that the north/south pole of the magnet is continuously attracted by the south/north pole of the rotating magnetic field generated by the stator, thereby rotating synchronously with the rotating magnetic field. Exemplary AC synchronous electric motors include interior permanent magnet (IPM) motors, reluctance motors, and hysteresis motors. In some embodiments, motor 150 may be an AC asynchronous motor such as an induction motor.

Motor 150 may be controlled by a motor control system 140. Motor control system 140 may regulate energy transfer from an energy storage device 130 to motor 150 to drive motor 150. In some embodiments, motor 150 may operate in a generator mode, such as when vehicle 100 undergoes speed reduction or braking actions. In the generator mode, the excess motion energy may be used to drive motor 150 to generate electrical energy and feed the energy back to energy storage device 130 through motor control system 140. In some embodiments, energy storage device 130 may include one or more batteries to supply DC power. Motor control system 140 may include a DC-AC inverter to convert the DC power supplied by energy storage device 130 into AC driving power to drive motor 150. For example, the DC-AC inverter may include power electronic devices operating under a PWM scheme to convert the DC power into AC power.

Vehicle 100 may include a vehicle control module 120 to provide overall control of vehicle 100. In some embodiments, vehicle control module 120 may act as an interface between user operation and propulsion system reaction. For example, when a driver depresses an acceleration pedal of vehicle 100, vehicle control module 120 may translate the acceleration operation into a torque value to be output by motor 150, a target rotation speed of motor 150, or other similar parameters to be executed by the propulsion system. Vehicle control module 120 may be communicatively connected to motor control system 140 to supply commands and/or receive feedback. Vehicle control module 120 may also be communicatively connected to energy storage device 130 to monitor operation status such as energy level, temperature, recharge count, etc.

Figure 2:
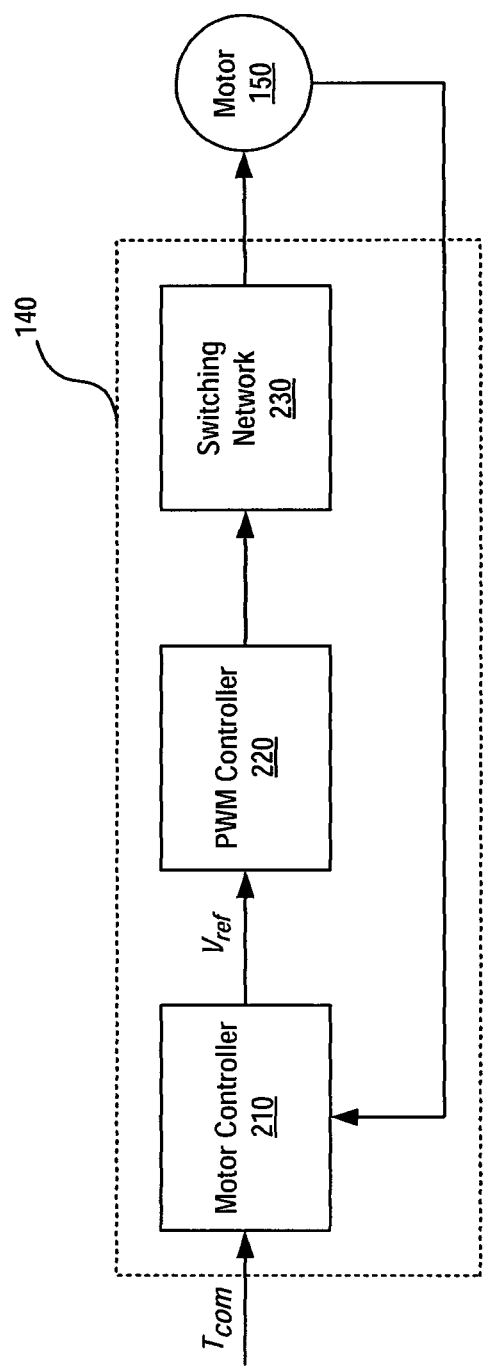
FIG. 2 is a block diagram of an exemplary motor control system, according to some disclosed embodiments.

FIG. 2 shows a block diagram of an exemplary embodiment of the motor control system 140. Motor control system 140 may receive a torque command $T_{com}$ generated by vehicle control module 120, for example, corresponding to an acceleration pedal depression action, and control motor 150 to output the required torque according to the torque command.

Motor control system 140 may include a motor controller 210, which may receive the torque command $T_{com}$ and covert the torque command to a reference voltage signal $V_{ref}$. For example, motor controller 210 may convert the torque command to a current command based on a maximum torque per ampere (MTPA) lookup table, and then convert the current command to the reference voltage signal $V_{ref}$. Motor control system 140 may also receive feedback from motor 150 to form a closed loop control.

Reference voltage signal $V_{ref}$ may indicate a target voltage for the motor control system 140 to generate to drive motor 150. To generate the target voltage, a PWM controller 220 may receive the reference voltage signal $V_{ref}$ and control a switching network 230 to produce the target voltage. PWM controller 220 and switching network 230 may form a driving circuit, which will be described in greater detail in connection with FIG. 3.

Figure 3:
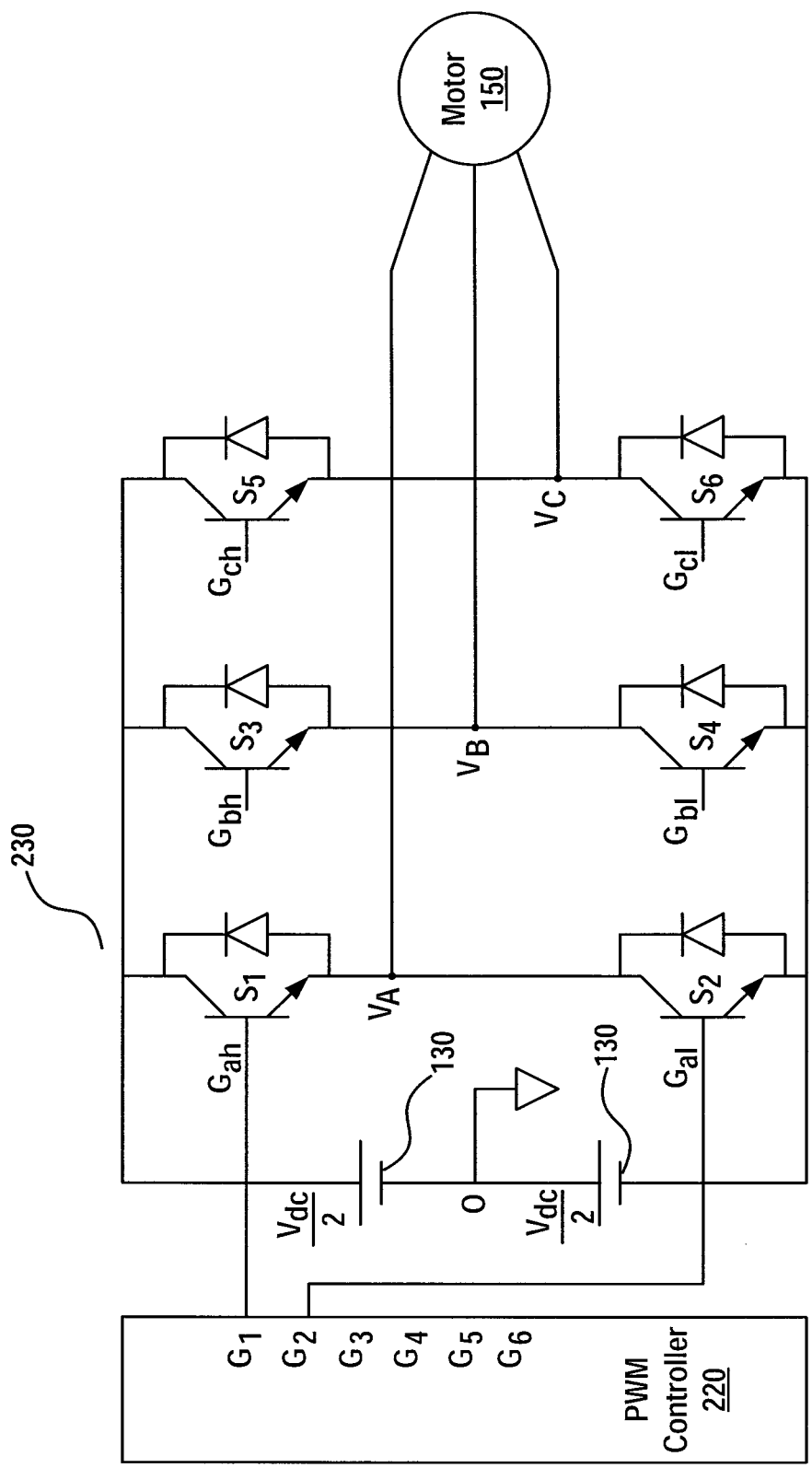
FIG. 3 is a circuit diagram illustrating an exemplary driving circuit, according to some disclosed embodiments.

FIG. 3 shows a circuit diagram illustrating an exemplary implementation of the driving circuit. Referring to FIG. 3, switching network 230 may be in a form of a three-phase full-bridge inverter (hereinafter also referred to as inverter 230). Inverter 230 may convert DC voltage supplied by energy storage device 130 (e.g., a battery or a group of batteries) into three-phase AC voltages to drive motor 150. As used herein, motor 150 may also be referred to as load 150. Inverter 230 may include six switching devices (also referred to as switches) $S_1$-$S_6$ that are arranged in a three-phase full-bridge manner. The switches may be power electronic devices such as insulated gate bipolar transistors (IGBTs) or metal-oxide-semiconductor field-effect transistors (MOSFETs). Each switch may be controlled by a switching signal applied to its gate terminal. The switching signal may be supplied by PWM controller 220 (hereinafter also referred to as controller 220 for simplicity). Controller 220 may include a memory for storing data associated with the switching signal, such as a look-up table, a formula, etc. The memory may also store software programs for implementing functions disclosed in this application. Controller 220 may also include a processing device (e.g., a microprocessor) communicatively connected with the memory for performing logic operations, computations, data processing, etc. For example, the processing device may execute the software programs stored in the memory to perform functions or operations disclosed in this application.

Controller 220 may be equipped with output terminal(s)/pin(s) for supplying the switching signal. As shown in FIG. 3, controller 220 includes a gate command pin $G_1$ that is electrically connected with the gate terminal $G_{ah}$ of switch $S_1$. Similarly, another gate command pin $G_2$ is electrically connected with the gate terminal $G_{al}$ of switch $S_2$. Here, gate terminal $G_{ah}$ indicates that it is the gate terminal of switch $S_1$ that is in phase A, high side (or upper arm). Similarly, gate terminal $G_{al}$ indicates that it is the gate terminal of switch $S_2$ that is in phase A, low side (or lower arm). The gate terminals of switches in phases B and C ($G_{bh}$, $G_{bl}$, $G_{ch}$, $G_{cl}$) can be similarly connected with respective gate command pins ($G_3$-$G_6$) of controller 130. For simplicity, these connections are omitted in FIG. 3.

During switching operations, $S_1$-$S_6$ may be turned on and off to supply phase voltages $V_{AO}$, $V_{BO}$, $V_{CO}$ with positive or negative DC voltage. For example, when $S_1$ is turned on and $S_2$ is turned off, $V_{AO}$ is roughly equal to $V_{dc}/2$ (neglecting the voltage drop on $S_1$). On the other hand, when $S_1$ is turned off and $S_2$ is turned on, $V_{AO}$ is roughly equal to $-V_{dc}/2$. By controlling the turning on/off durations, a series of positive and negative pulses can be generated as phase voltages. These pulses, as discussed above, contain a fundamental wave component and harmonics. The fundamental wave component may be used for driving motor 150 while the harmonics may be filtered out using a low-pass filter.

Because in each phase, the upper and lower switches cannot be turned on at the same time (or else unwanted noise events may occur), there are eight different switching states that are available for inverter 230. For example, one switching state is when $S_1$, $S_4$, and $S_6$ are turned on and $S_2$, $S_3$, and $S_5$ are turned off. The switching status of inverter 230 can be represented by the turning on/off states of all upper switches (or similarly by all lower switches) as a three-element vector (corresponding to the three phases) consisting of "1"s and "0"s. A "1" in the vector represents that the upper switch of a corresponding phase is turned on and a "0" in the vector represents that the upper switch of a corresponding phase is turned off. These vectors may also be referred to as space vectors, voltage vectors, or switching vectors. The eight space vectors can be defined as follows:

$V_1$: ($S_1$, $S_3$, $S_5$)=(1, 0, 0);
$V_2$: ($S_1$, $S_3$, $S_5$)=(1, 1, 0);
$V_3$: ($S_1$, $S_3$, $S_5$)=(0, 1, 0);
$V_4$: ($S_1$, $S_3$, $S_5$)=(0, 1, 1);
$V_5$: ($S_1$, $S_3$, $S_5$)=(0, 0, 1);
$V_6$: ($S_1$, $S_3$, $S_5$)=(1, 0, 1);
$V_7$: ($S_1$, $S_3$, $S_5$)=(1, 1, 1);
$V_0$: ($S_1$, $S_3$, $S_5$)=(0, 0, 0).

Figure 4:
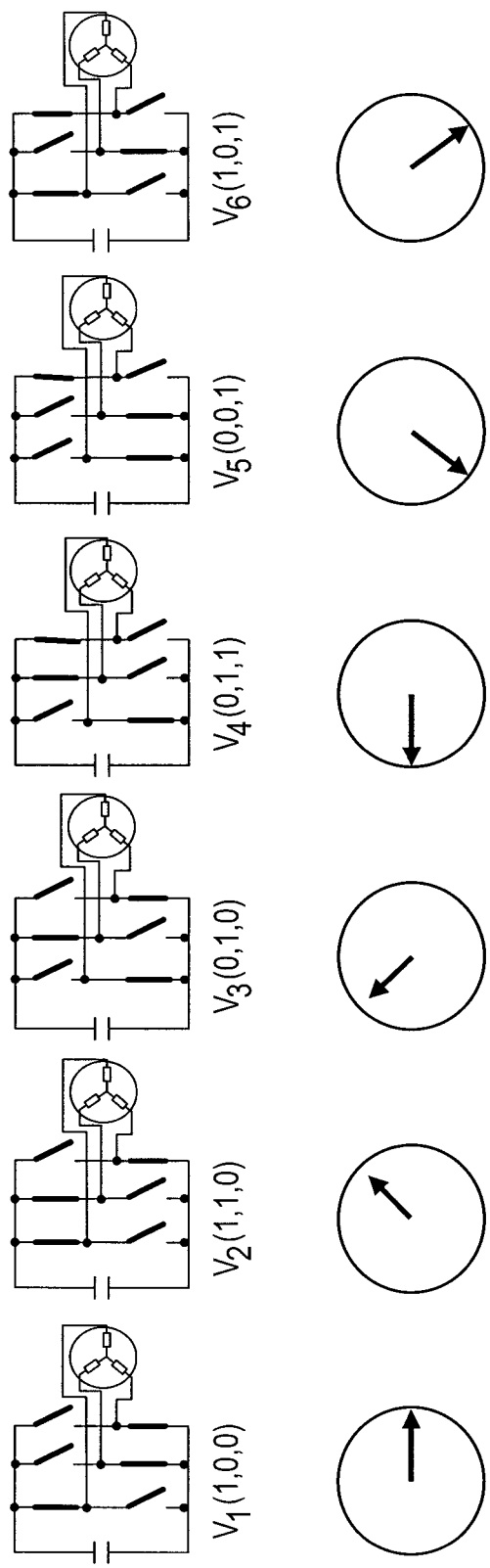
FIG. 4 illustrates exemplary space vectors, according to some disclosed embodiments.

FIG. 4 shows exemplary space vectors (lower row) that correspond to the switching states of $V_1$-$V_6$ (upper row). The upper row shows the switching status represented by the turning on/off states of the switches. The directions of the active (non-zero) space vectors can be defined to be 60-degree apart, corresponding to the six switching states, as shown in the lower row of FIG. 4. The three-element space vectors representing the switching status of inverter 230 above are referred to throughout this specification, but are simply described as "space vectors" or "vectors" for ease of reference.

Figure 5:
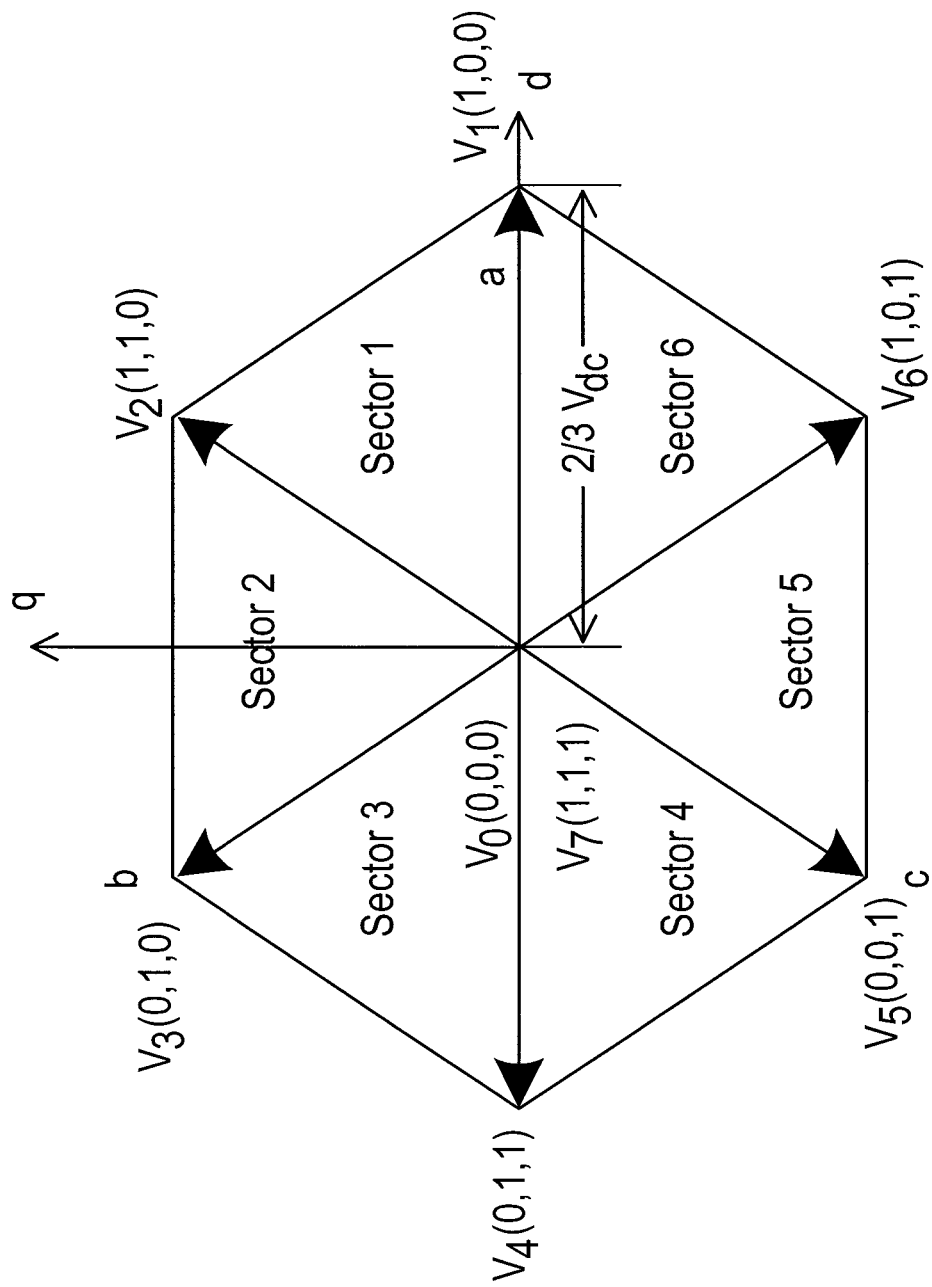
FIG. 5 shows a space vector hexagon, according to some disclosed embodiments.
Figure 6:
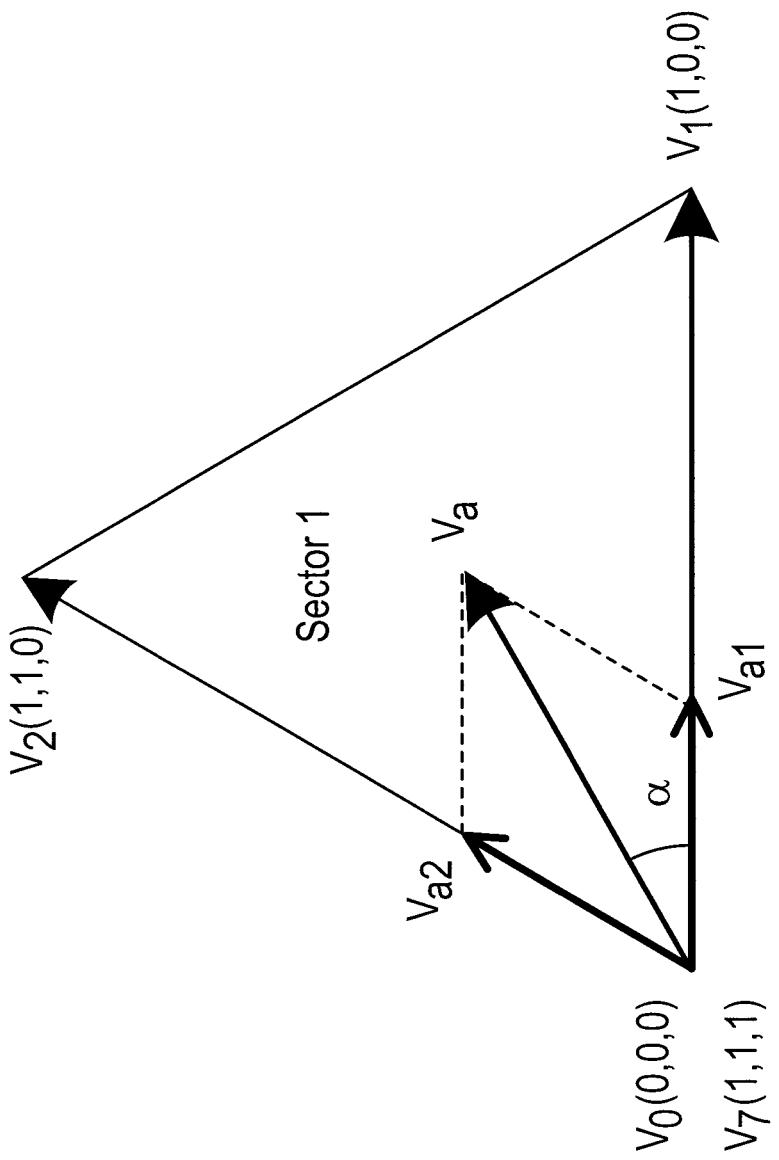
FIG. 6 shows decomposition of a voltage vector, according to some disclosed embodiments.

FIG. 5 shows a hexagon that contains all eight space vectors. As shown in FIG. 5, the hexagon is divided by space vectors $V_1$-$V_6$ into six sectors (Sector 1 to Sector 6). $V_0$ and $V_7$ are zero vectors that "shrink" to a point located at the origin. $V_0$ and $V_7$ have zero length. The length of each remaining space vector is $2/3V_{dc}$. Using the hexagon and the space vectors shown in FIG. 5, an arbitrary space vector can be represented as a sum of decomposed vectors. For example, FIG. 6 shows an arbitrary space vector $V_a$ in Sector 1. $V_a$ can be represented as $V_a=V_{a1}+V_{a2}$, where $V_{a1}$ and $V_{a2}$ are the decomposed vectors along the directions of $V_1$ an $V_2$, respectively. In other words, $V_a$ can be synthesized by $V_1$ and $V_2$ through turning on $V_1$ and $V_2$ for time intervals proportional to $V_{a1}$ and $V_{a2}$, respectively. The "off" state can be represented using $V_0$ and/or $V_7$. For ease of reference, "the space vector hexagon" or "the hexagon" is used throughout this specification to refer to the hexagon shown in FIG. 5.

A space vector shown in FIGS. 5 and 6 may correspond to a three-phase voltage applied to motor 150. As shown in FIG. 5, a three-phase voltage, including three voltage components having a 120-degree phase shift between one another, can be represented using axes a, b, and c. The three-phase voltage can be decomposed in a reference frame (referred to as the d-q reference frame), in which the field flux linkage component (along the d axis) and the torque component (along the q axis) of the three-phase voltage are decoupled to orthogonal directions d and q. Therefore, a three-phase voltage corresponds to a space vector in the d-q reference frame and vice versa. During operation, a space vector may rotate in the d-q reference frame along a trajectory.

As described above, one purpose of performing modulation is to generate, for example through inverter 230, a voltage signal that has the same fundamental magnitude as that of a reference signal provided by motor controller 210. Because the reference voltage signal can be represented by a space vector in the d-q reference frame, the modulation can be described in terms of space vectors. Depending on the magnitude of the space vector corresponding to the reference voltage signal, there can be three types of modulation. When the magnitude of the space vector is smaller than $$\frac{1}{\sqrt{3}} V_{dc}$$

Figure 7A:
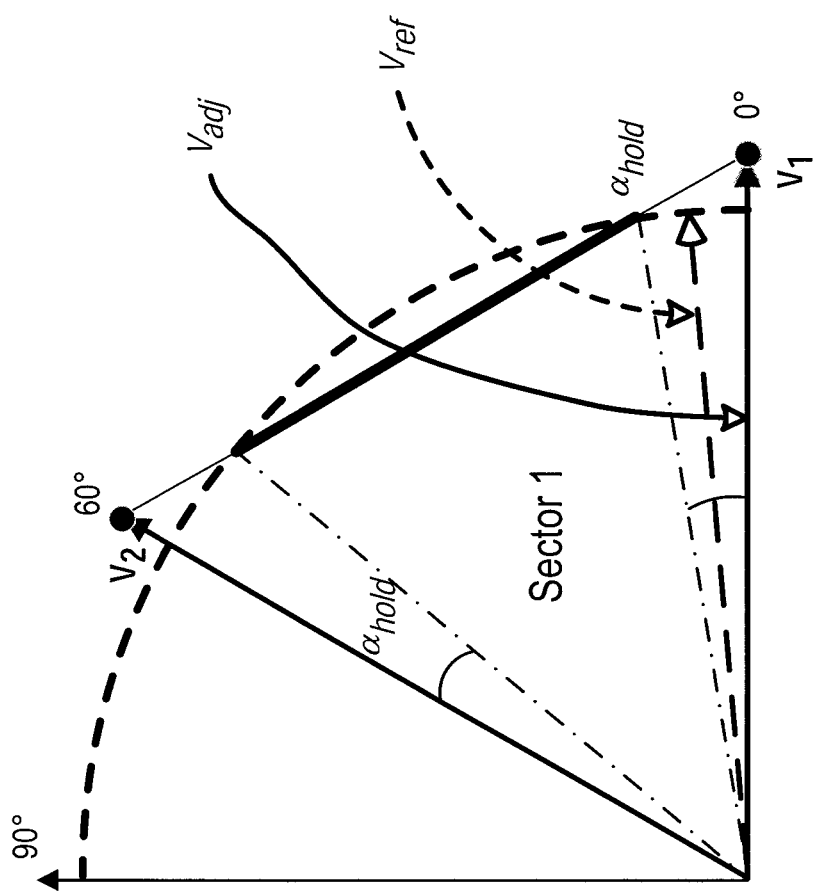
FIGS. 7A-7C illustrate exemplary methods of voltage generation when the voltage vector falls within different regions, according to some disclosed embodiments.
Figure 7B:
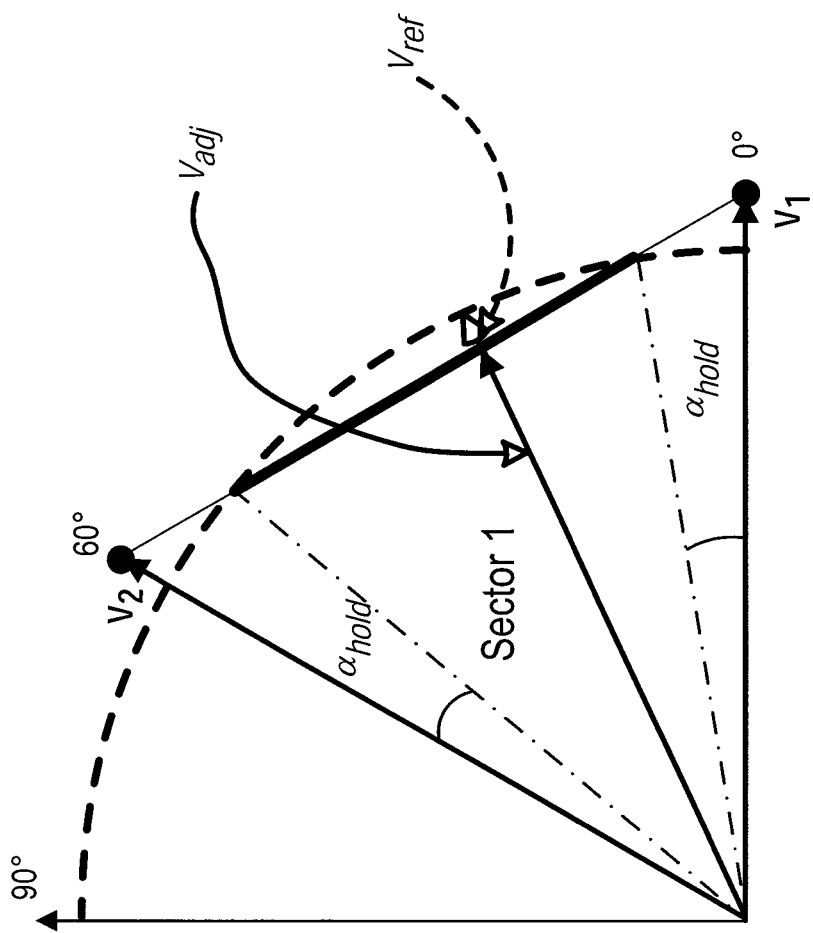
Figure 7C:
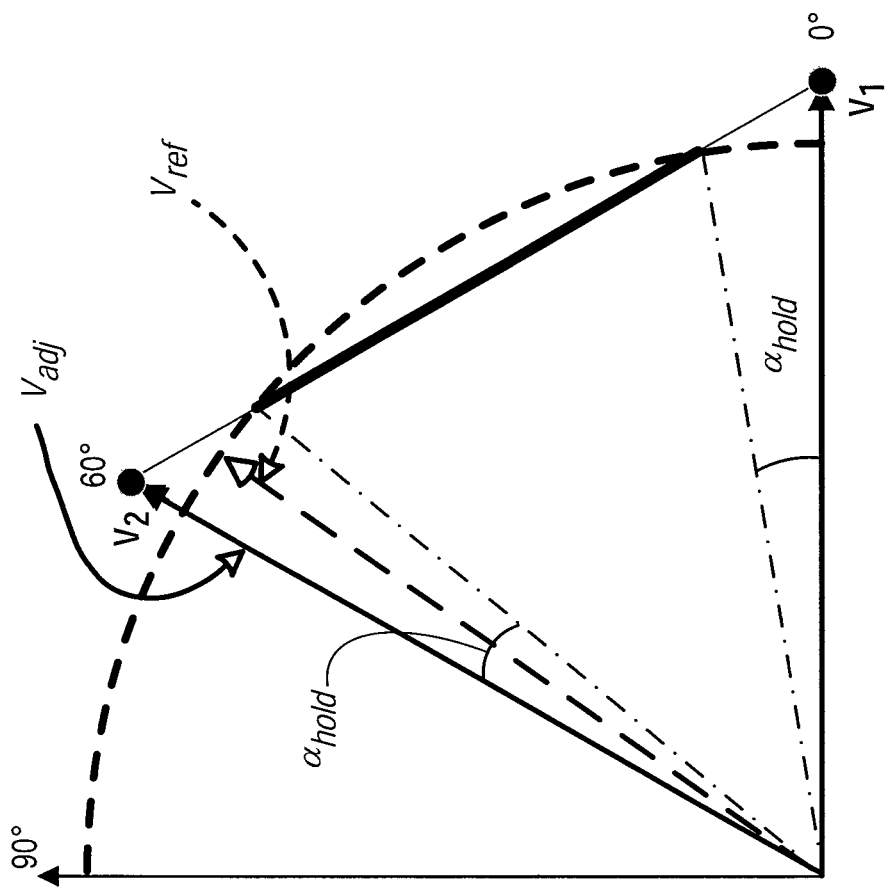

(e.g., the radius of the inscribed circle of the hexagon), the entire trajectory of the rotating space vector is within the hexagon. Therefore, the space vector (e.g., corresponding to a three-phase voltage) can be generated using SVPWM operating in the linear modulation range, as described above. When the magnitude of the space vector is larger than $$\frac{1}{\sqrt{3}} V_{dc},$$

however, at certain angles the space vector reaches regions outside of the hexagon and thus, over-modulation should be used to generate such space vector. In over-modulation, the space vectors reaching outside of the hexagon need to be adjusted because inverter 230 cannot generate voltage signals falling outside of the hexagon. As used herein, the reference voltage signal is referred to as being subject to over-modulation when its corresponding space vector reaches outside of the hexagon. As described above, there are two types of over-modulation. When the magnitude of the space vector is larger than $$\frac{1}{\sqrt{3}} V_{dc}$$

but smaller than 0.606 $V_{dc}$, mode I over-modulation can be used, in which the angle of the space vector is preserved but he magnitude of the space vector is shrank to an outer edge of the hexagon. Mode II over-modulation starts at a modulation index of about 0.952 and the corresponding fundamental voltage is 0.606 $V_{dc}$. FIGS. 7A-7C illustrate exemplary methods of voltage generation in mode II when the space vector corresponding to the reference voltage signal $V_{ref}$ (also referred to as the reference voltage vector $V_{ref}$) is larger than 0.606 $V_{dc}$ and reaches regions outside of the hexagon. Because the voltage generation operation is the same for each of the sectors, Sector 1 is used to illustrate the operation principle in FIGS. 7A-7C.

Referring to FIG. 7A, the two space vectors $V_1$ and $V_2$ marking the boundaries of Sector 1 are located at angles 0 and 60 degrees, respectively. The trajectory of the reference voltage vector $V_{ref}$ is represented by a quarter-circle dashed line. Some part of the trajectory is outside the edge of the hexagon (i.e., the edge of the triangle formed by space vectors $V_1$ and $V_2$). Assuming that the desired modulation index corresponding to $V_{ref}$ is larger than 0.952, which requires mode II over-modulation, an adjusted voltage vector $V_{adj}$ may be generated with the same fundamental wave component as $V_{ref}$ in the following way: when the angle of the reference voltage vector $V_{ref}$ is between 0 degree and a holding angle $\alpha_{hold}$, $V_{adj}$ is held at the vertex ($V_1$, 0 degree). In other words, $V_{ref}$ is adjusted to match $V_1$. Then, referring to FIG. 7B, when the angle of the reference voltage vector $V_{ref}$ passes the holding angle $\alpha_{hold}$, the angle of the adjusted voltage vector $V_{adj}$ assumes the same angle as $V_{ref}$ and the magnitude of $V_{adj}$ is adjusted so that $V_{adj}$ slides along the edge of the hexagon. Next, when the angle of the reference voltage vector $V_{ref}$ is between (60 degrees–$\alpha_{hold}$) and 60 degrees, as shown in FIG. 7C, $V_{adj}$ is held to the next vertex ($V_2$, 60 degrees). In other words, $V_{ref}$ is adjusted to match $V_2$. After that, $V_{ref}$ enters into the next sector (Sector 2) and the above-described operations repeat.

The region between 0 degree and holding angle $\alpha_{hold}$, between (60 degrees–$\alpha_{hold}$) and 60 degrees, between (360 degrees–$\alpha_{hold}$) and $\alpha_{hold}$, or between (60 degrees–$\alpha_{hold}$) and (60 degrees+$\alpha_{hold}$), may be referred to as a holding region. When $V_{ref}$ is within a holding region, that is, when the angle of $V_{ref}$ falls within the range between the lower and upper threshold angles of the holding region, $V_{adj}$ may be held at the vertex that is within or bordering the holding region. In other words, $V_{ref}$ may be adjusted to match one of the six space vectors representing the six non-zero switching states that is within or bordering the holding region.

The holding angle $\alpha_{hold}$ may be pre-calculated and stored in a look-up table or calculated on-the-fly during real-time operation. The value of $\alpha_{hold}$ depends on the modulation index $m_{cmd}$ of the reference voltage vector $V_{ref}$ and can be calculated using Fourier analysis based on the following equation (a in the equation represents $\alpha_{hold}$):

$$m_{cmd} = \frac{4}{\pi} * \frac{1}{\frac{2}{\pi} * V_{dc}} * \left( \int_0^\alpha M_1 \cos\theta d\theta + \int_\alpha^{\frac{\pi}{3}-\alpha} M_2 \cos\theta d\theta + \int_{\frac{\pi}{3}-\alpha}^{\frac{\pi}{3}+\alpha} M_3 \cos\theta d\theta + \int_{\frac{\pi}{3}+\alpha}^{\frac{\pi}{2}} M_4 \cos\theta d\theta \right)$$

Figure 8:
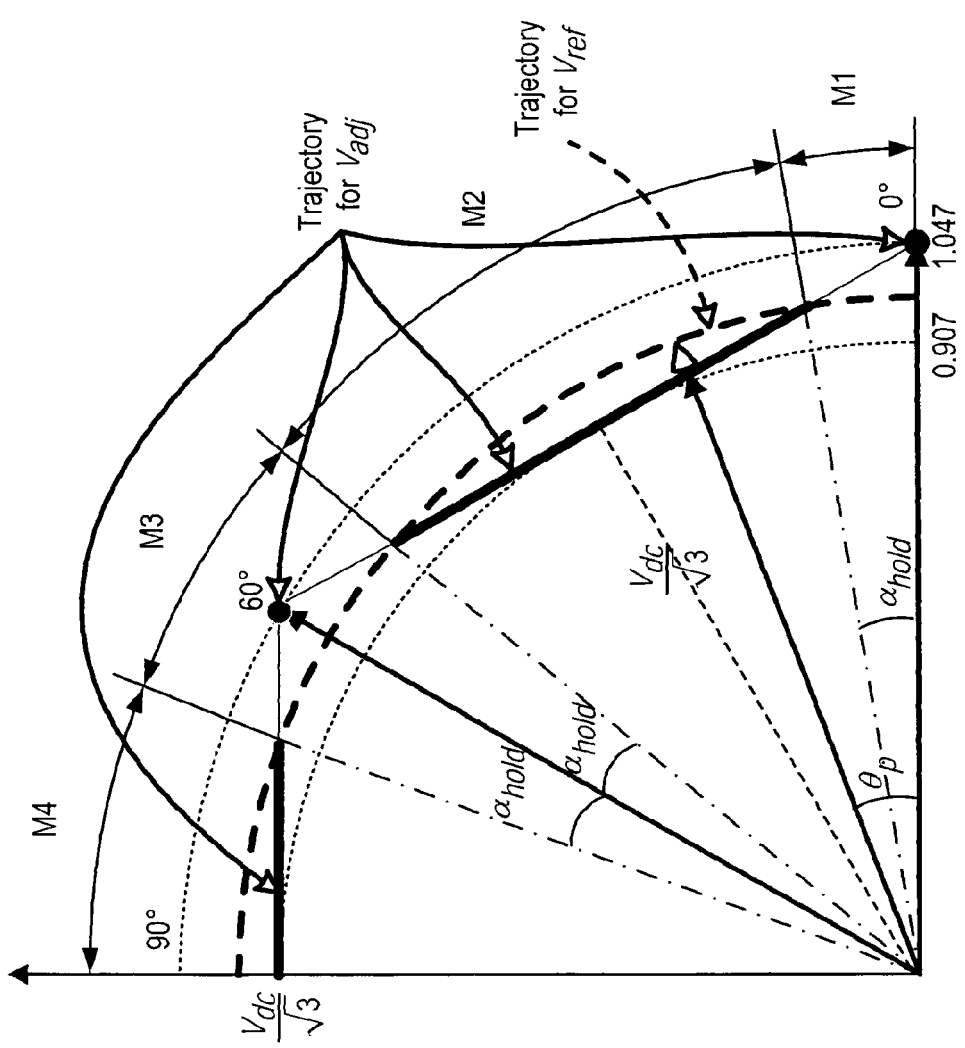
FIG. 8 shows exemplary regions and trajectories of adjusted voltage in difference regions, according to some disclosed embodiments.

$M_1$, $M_2$, $M_3$, and $M_4$ represent the four regions shown in FIG. 8. FIG. 8 also shows a modulation index of 0.907 corresponding to the inscribed circle the hexagon and a modulation index of 1.047 corresponding to the vertices of the hexagon. The radius of the inscribed circle is $$\frac{1}{\sqrt{3}} V_{dc}.$$

The trajectory of $V_{ref}$ is a circle (shown only a quarter of it in FIG. 8) between the circles corresponding to modulation indices 0.907 and 1.047, while the trajectory of $V_{adj}$ includes discrete vertices and portions of the outer edges of the hexagon.

Table 1 lists the angle ($\theta_p$) and magnitude ($V_{cmd}$) of $V_{adj}$ in regions $M_1$-$M_4$, assuming the corresponding angle of $V_{ref}$ is $\theta$.

TABLE 1

| Region | $\theta_{min}$ | $\theta_{max}$ | $\theta_p$ | $V_{cmd}$ |
|---|---|---|---|---|
| $M_1$ | 0 | $\alpha_h$ | 0 | $\frac{2}{3} * V_{dc} * \cos \theta_p = \frac{2}{3} * V_{dc}$ |
| $M_2$ | $\alpha_h$ | $\frac{\pi}{3} - \alpha_h$ | $\theta$ | $\frac{V_{dc}}{\sqrt{3}} * \frac{1}{\cos\left(\frac{\pi}{6} - \theta_p\right)} * \cos \theta_p$ |
| $M_3$ | $\frac{\pi}{3} - \alpha_h$ | $\frac{\pi}{3} + \alpha_h$ | $\frac{\pi}{3}$ | $\frac{2}{3} * V_{dc} * \cos \theta_p = \frac{1}{3} * V_{dc}$ |
| $M_4$ | $\frac{\pi}{3} + \alpha_h$ | $\frac{\pi}{2}$ | $\theta$ | $\frac{V_{dc}}{\sqrt{3}} * \frac{1}{\sin \theta_p} * \cos \theta_p$ |

Figure 9:
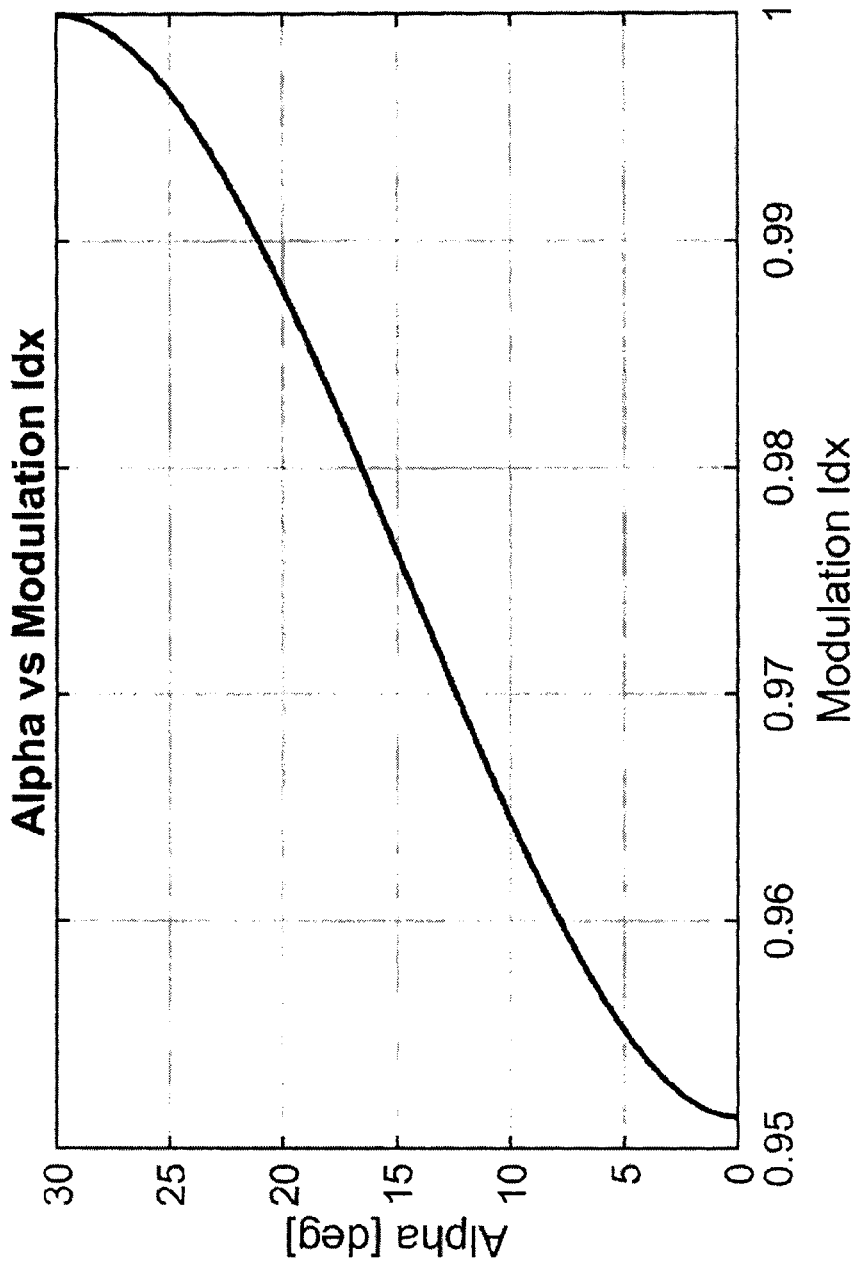
FIG. 9 shows exemplary relationship between modulation index and holding angle, according to some disclosed embodiments.

FIG. 9 shows relationship between holding angle $\alpha_{hold}$ and the modulation index of reference voltage vector $V_{ref}$. As shown in FIG. 9, the value of holding angle $\alpha_{hold}$ varies between 0 and 30 degrees. When it reaches 30 degrees, inverter 230 operates in the six-step mode, in which $V_{adj}$ is held at the vertex until $V_{ref}$ reaches the 30 degree center line within the sector. After $V_{ref}$ passes the 30 degree center line, $V_{adj}$ jumps to the next vertex.

Figure 10:
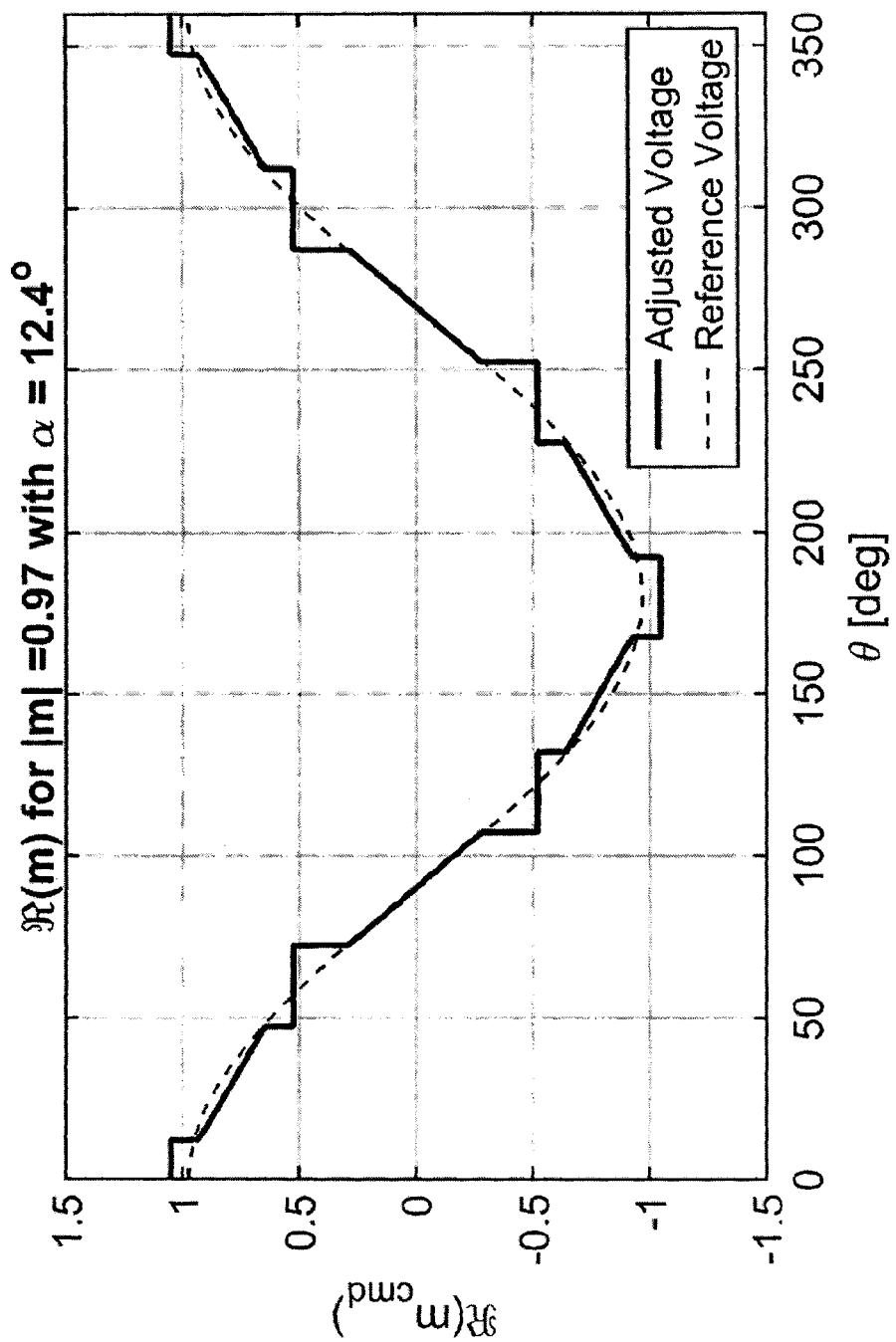
FIG. 10 shows an exemplary comparison between real parts of adjusted and reference voltage signals, according to some disclosed embodiments.

FIG. 10 shows an exemplary comparison between the real part of modulation indices of the reference and adjusted voltage vectors. In FIG. 10, the horizontal axis represents the angle of the reference and adjusted voltage vectors, while the vertical axis represents the real part of the modulation indices of the reference and adjusted voltage vectors. The example shown in FIG. 10 compares the real parts of the modulation indices of the reference and adjusted voltage vectors when the magnitude of the modulation index of the reference voltage is 0.97, which is larger than 0.952 and thus mode II over-modulation is used. The holding angle is set to be 12.3 degrees. The holding angle can be pre-calculated and stored in a look-up table or can be calculated in real time. As shown in FIG. 10, the horizontal line portions of the adjusted voltage curve indicate that $V_{adj}$ is held at one of the vertices, while the sloped portions indicate that $V_{adj}$ moves along an edge of the hexagon. When $V_{adj}$ is held at the vertices, no switching is required. Therefore, maximizing the time spent at the vertices can minimize the number of switching operations, thereby reducing the switching loss.

Figure 11:
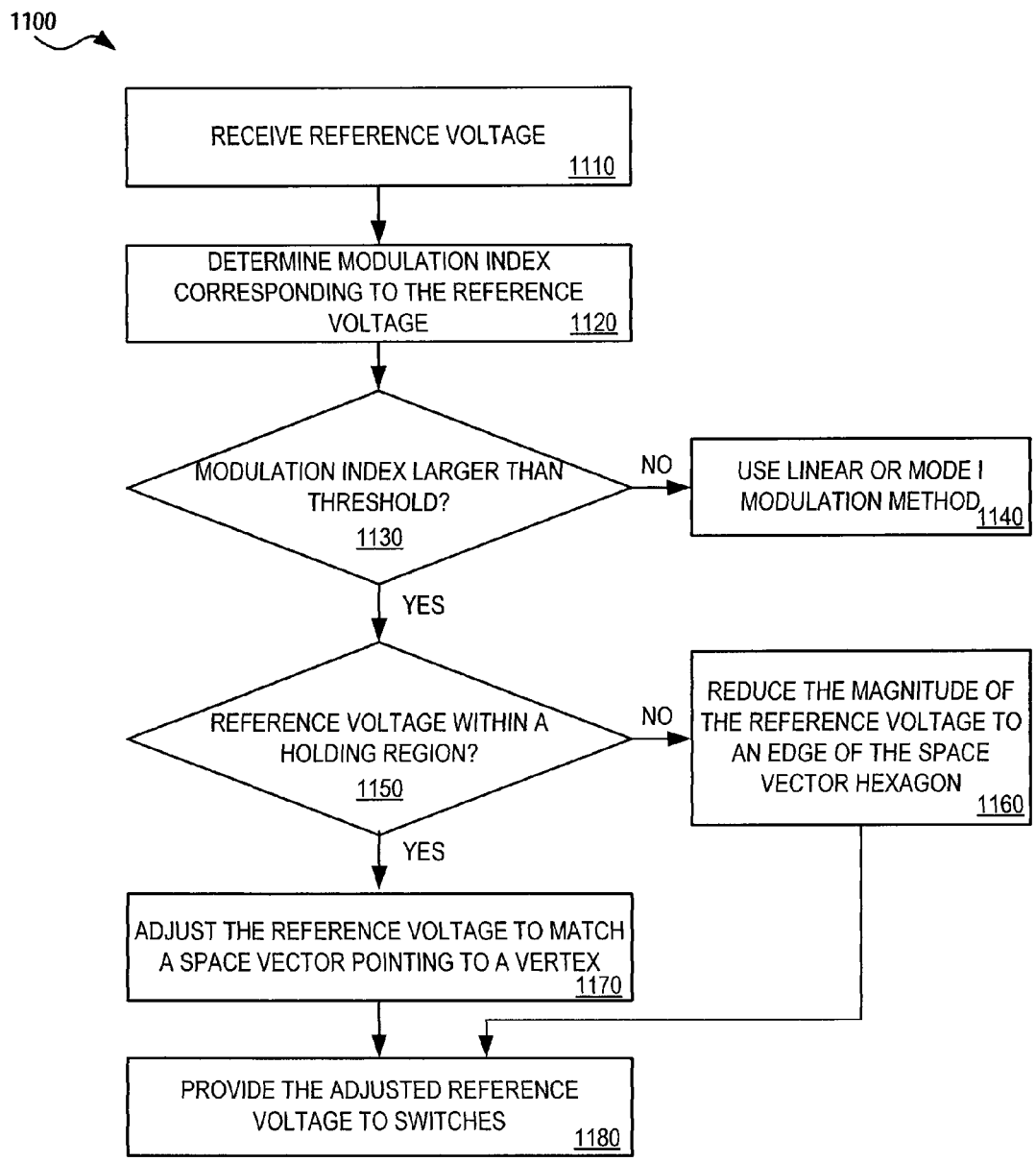
FIG. 11 is a flow chart of an exemplary method for high-modulation index voltage generation, according to some disclosed embodiments.

FIG. 11 is a flow chart showing steps of an exemplary method 1100 for suppressing switching interference, according to some disclosed embodiments. Method 1100 may be implemented by controller 220. Although method 1100 shown in FIG. 11 includes a plurality of steps, some of these steps may be optional.

In step 1110, controller 220 may receive a reference voltage signal from motor controller 210. The reference voltage signal may indicate a target voltage to be generated by inverter 230 to drive motor 150. The reference voltage signal may correspond to a reference space vector in the d-q reference frame and may be represented as $V_{ref}$.

In step 1120, controller 220 may determine the modulation index based on the reference voltage signal (e.g., $V_{ref}$). As described above, the modulation index is a ratio between a magnitude of a fundamental wave of an output voltage generated by inverter 230 resulting from the reference voltage signal and a magnitude of a fundamental wave of a maximum output voltage that can be generated by inverter 230 (e.g., when inverter 230 operates in the six-step mode).

In step 1130, controller 220 may determine whether the modulation index is larger than a threshold, such as 0.952. Alternatively, controller 220 may determine whether the magnitude of the reference voltage is greater than 0.606 time of the DC voltage. If the modulation index is larger than the threshold, method 1100 proceeds to step 1150. Otherwise, method 1100 proceeds to step 1140, in which controller 220 may use traditional linear or mode I non-linear modulation methods to generate the reference voltage.

In step 1150, controller 220 may determine whether the reference voltage falls within a holding region (e.g., region $M_1$ or $M_3$ in FIG. 8). The holding region may include a lower boundary indicated by a lower threshold angle (e.g., 0 degree or 60−$\alpha_{hold}$ degrees) and an upper boundary indicated by an upper threshold angle (e.g., $\alpha_{hold}$ degrees or 60+$\alpha_{hold}$ degrees). The holding angle $\alpha_{hold}$ may be retrieved from a lookup table storing pre-calculated values or can be calculated in real time. Controller 220 may determine the angle of the reference voltage and then determine whether the angle of the reference voltage falls within a range between the lower threshold angle and the upper threshold angle. If the angle of the reference voltage falls within the range, then it indicates that the reference voltage falls within the holding region, and method 1100 proceeds to step 1170. Otherwise, method 1100 proceeds to step 1160, in which the magnitude of reference voltage is reduced to reach an edge of the space vector hexagon and the angle of the reference voltage is unchanged. In other words, the adjusted reference voltage slides along the edge of the hexagon.

In step 1170, controller 220 may generate an adjusted reference voltage by adjusting the space vector corresponding to the reference voltage to match a predetermined space vector (e.g., the space vector pointing to a vertex). Therefore, the adjusted reference voltage is kept at the vertex until the reference voltage moves outside the holding region.

Method 1100 may proceed to step 1180 from both steps 1160 and 1170. In step 1180, controller 220 may provide the adjusted reference voltage to the switches to drive motor 150.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments.

It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. A driving circuit for driving a load, comprising:
  a plurality of switching devices electrically connected to the load; and a controller electrically connected to the plurality of switching devices, wherein the controller is configured to:
receive a reference voltage signal indicating a target voltage for the driving circuit to generate to drive the load, the reference voltage signal corresponding to a reference space vector in a reference frame in which a field flux linkage component and a torque component of the reference voltage signal are decoupled to orthogonal directions, wherein the reference space vector represents a combination of the decoupled field flux linkage component and the torque component of the reference voltage signal;
determine that the reference space vector falls within a holding region in which the reference voltage signal is subject to over-modulation;
determine a first holding angle and a second holding angle;
when an angle of the reference voltage is 0 degree and the first holding angle, set an adjusted reference voltage to a first voltage;
when an angle of the reference voltage is between the first holding angle and the second holding angle, vary the adjusted reference voltage linearly with an angle of the adjusted reference voltage being equal to the angle of the reference voltage;
when an angle of the reference voltage is between the second holding angle and 60 degrees, set the adjusted reference voltage to a second voltage; and
provide the adjusted reference voltage signal to the plurality of switching devices to drive the load.

2. The driving circuit of claim 1, wherein the controller is further configured to:
determine a modulation index based on the reference voltage signal, the modulation index representing a ratio between a magnitude of a fundamental wave of an output voltage generated by the driving circuit resulting from the reference voltage signal and a magnitude of a fundamental wave of a maximum output voltage that can be generated by the driving circuit; and
determine a boundary of the holding region when the modulation index is greater than a predetermined threshold.

3. The driving circuit of claim 1, wherein:
the plurality of switching devices include six power electronic devices configured to form a three-phase inverter;
a predetermined space vector is selected from six non-zero switching vectors supported by the three-phase inverter, each non-zero switching vector corresponding to a different switching state of the three-phase inverter; and
an angle of the predetermined space vector falls within the holding region.

4. The driving circuit of claim 1, wherein a magnitude of the reference space vector is greater than 0.606 time of a DC voltage applied to the plurality of switching devices.

5. The driving circuit of claim 2, wherein the controller is further configured to:
retrieve information of a predetermined holding angle corresponding to the modulation index from a lookup table, the predetermined holding angle indicating the boundary of the holding region.

6. The driving circuit of claim 2, wherein the controller is further configured to:
calculate a holding angle corresponding to the modulation index, the holding angle indicating the boundary of the holding region.

7. A method for driving a load through a driving circuit including a plurality of switching devices, the method comprising:
receiving a reference voltage signal indicating a target voltage to be generated by the driving circuit to drive the load, the reference voltage signal corresponding to a reference space vector in a reference frame in which a field flux linkage component and a torque component of the reference voltage signal are decoupled to orthogonal directions, wherein the reference space vector represents a combination of the decoupled field flux linkage component and the torque component of the reference voltage signal;
determining that the reference space vector falls within a holding region in which the reference voltage signal is subject to over-modulation;
determining a first holding angle and a second holding angle;
when an angle of the reference voltage signal is smaller than the first holding angle, setting an angle of an adjusted reference angle to 0 degree;
when the angle of the reference voltage is between the first holding angle and the second holding angle, setting the angle of the adjusted reference voltage equal to the angle of the reference voltage;
when the angle of the reference voltage is between the second holding angle and 60 degrees, setting the angle of the adjusted reference voltage to 60 degrees; and
providing the adjusted reference voltage signal to the plurality of switching devices to drive the load.

8. The method of claim 7, comprising:
determining a modulation index based on the reference voltage signal, the modulation index representing a ratio between a magnitude of a fundamental wave of an output voltage generated by the driving circuit resulting from the reference voltage signal and a magnitude of a fundamental wave of a maximum output voltage that can be generated by the driving circuit; and
determining a boundary of the holding region when the modulation index is greater than a predetermined threshold.

9. The method of claim 7, wherein:
the plurality of switching devices include six power electronic devices configured to form a three-phase inverter;
a predetermined space vector is selected from six non-zero switching vectors supported by the three-phase inverter, each non-zero switching vector corresponding to a different switching state of the three-phase inverter.

10. The method of claim 7, wherein a magnitude of the reference space vector is greater than 0.606 time of a DC voltage applied to the plurality of switching devices.

11. The method of claim 8, comprising:
retrieving information of a predetermined holding angle corresponding to the modulation index from a lookup table, the predetermined holding angle indicating the boundary of the holding region.

12. The method of claim 8, comprising:
calculating a holding angle corresponding to the modulation index, the holding angle indicating the boundary of the holding region.

13. An electric motor propulsion system of an electric vehicle, the system comprising:

an electric motor configured to output torque for propelling the electric vehicle; and a motor control system configured to control operations of the electric motor, wherein the motor control system includes a driving circuit including:
- a plurality of switching devices electrically connected to the electric motor; and
- a controller electrically connected to the plurality of switching devices, wherein the controller is configured to:
  - receive a reference voltage signal indicating a target voltage for the driving circuit to generate to drive the electric motor, the reference voltage signal corresponding to a reference space vector in a reference frame in which a field flux linkage component and a torque component of the reference voltage signal are decoupled to orthogonal directions, wherein the reference space vector represents a combination of the decoupled field flux linkage component and the torque component of the reference voltage signal;
  - determine that the reference space vector falls within a holding region in which the reference voltage signal is subject to over-modulation;
  - determine a first holding angle and a second holding angle;
  - when an angle of the reference voltage is smaller than the first holding angle, set an angle of an adjusted reference to 0 degree;
  - when the angle of the reference voltage is between the first holding angle and the second holding angle, set the angle of an adjusted reference voltage equal to an angle of the reference voltage;
  - when the angle of the reference voltage is between the second holding angle and 60 degrees, set the angle of an adjusted reference voltage to 60 degrees; and
  - provide the adjusted reference voltage signal to the plurality of switching devices to drive the electric motor.

14. The electric motor propulsion system of claim 13, wherein the controller is further configured to:
- determine a modulation index based on the reference voltage signal, the modulation index representing a ratio between a magnitude of a fundamental wave of an output voltage generated by the driving circuit resulting from the reference voltage signal and a magnitude of a fundamental wave of a maximum output voltage that can be generated by the driving circuit; and
- determine a boundary of the over-modulation region when the modulation index is greater than a predetermined threshold.

15. The electric motor propulsion system of claim 13, wherein:
- the plurality of switching devices include six power electronic devices configured to form a three-phase inverter;
- a predetermined space vector is selected from six non-zero switching vectors supported by the three-phase inverter, each non-zero switching vector corresponding to a different switching state of the three-phase inverter.

16. The electric motor propulsion system of claim 14, wherein the controller is further configured to:
- retrieve information of a predetermined holding angle corresponding to the modulation index from a lookup table, the predetermined holding angle indicating the boundary of the holding region.

17. The electric motor propulsion system of claim 14, wherein the controller is further configured to:
- calculate a holding angle corresponding to the modulation index, the holding angle indicating the boundary of the holding region.

\* \* \* \* \*